United States Patent
Cunningham et al.

(10) Patent No.: US 11,494,596 B2
(45) Date of Patent: *Nov. 8, 2022

(54) SYSTEMS AND METHODS FOR PERFORMING OBJECT DETECTION AND MOTION DETECTION ON VIDEO INFORMATION

(71) Applicant: Mythical, Inc., Sherman Oaks, CA (US)

(72) Inventors: Stephan Cunningham, Pasadena, CA (US); Cameron Thacker, Sherman Oaks, CA (US); Chris Downs, Encino, CA (US); John Linden, Sherman Oaks, CA (US)

(73) Assignee: Mythical, Inc., Sherman Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/194,207

(22) Filed: Mar. 5, 2021

(65) Prior Publication Data

US 2021/0192266 A1 Jun. 24, 2021

Related U.S. Application Data

(63) Continuation of application No. 16/596,259, filed on Oct. 8, 2019, now Pat. No. 10,970,602.

(51) Int. Cl.
| | |
|---|---|
| *G06K 9/00* | (2022.01) |
| *G06K 9/62* | (2022.01) |
| *G06T 5/00* | (2006.01) |
| *G06T 7/246* | (2017.01) |
| *G06V 20/40* | (2022.01) |
| *G06V 40/16* | (2022.01) |

(52) U.S. Cl.
CPC ............. *G06K 9/628* (2013.01); *G06T 5/002* (2013.01); *G06T 7/246* (2017.01); *G06V 20/46* (2022.01); *G06V 40/164* (2022.01); *G06V 40/166* (2022.01)

(58) Field of Classification Search
CPC ............. G06K 9/628; G06K 9/00241; G06K 9/00255; G06K 9/00744; G06T 5/002; G06T 7/246

See application file for complete search history.

(56) References Cited

U.S. PATENT DOCUMENTS

| | | | |
|---|---|---|---|
| 10,970,602 B1 | 4/2021 | Cunningham | |
| 11,190,680 B1 * | 11/2021 | Tran | H04N 5/23219 |
| 2010/0070483 A1 * | 3/2010 | Delgo | G06F 16/739 |
| | | | 707/706 |
| 2019/0065910 A1 * | 2/2019 | Wang | G06V 20/10 |
| 2020/0145623 A1 * | 5/2020 | Sadanand | H04N 7/181 |
| 2021/0103761 A1 | 4/2021 | Cunningham | |

\* cited by examiner

*Primary Examiner* — Dhaval V Patel
(74) *Attorney, Agent, or Firm* — Esplin & Associates, PC

(57) ABSTRACT

Systems and methods for converting video information into electronic output files are disclosed. Exemplary implementations may: obtain video information defining one or more videos; select a subset of the visual content included in the video content of the particular video; perform object detection to detect objects in the selected subset; perform motion detection to detect a movement for one or more of the detected objects in the selected subset, responsive to the object detection detecting one or more detected objects; and generate and store an electronic output file, responsive to the detection of the movement.

20 Claims, 5 Drawing Sheets

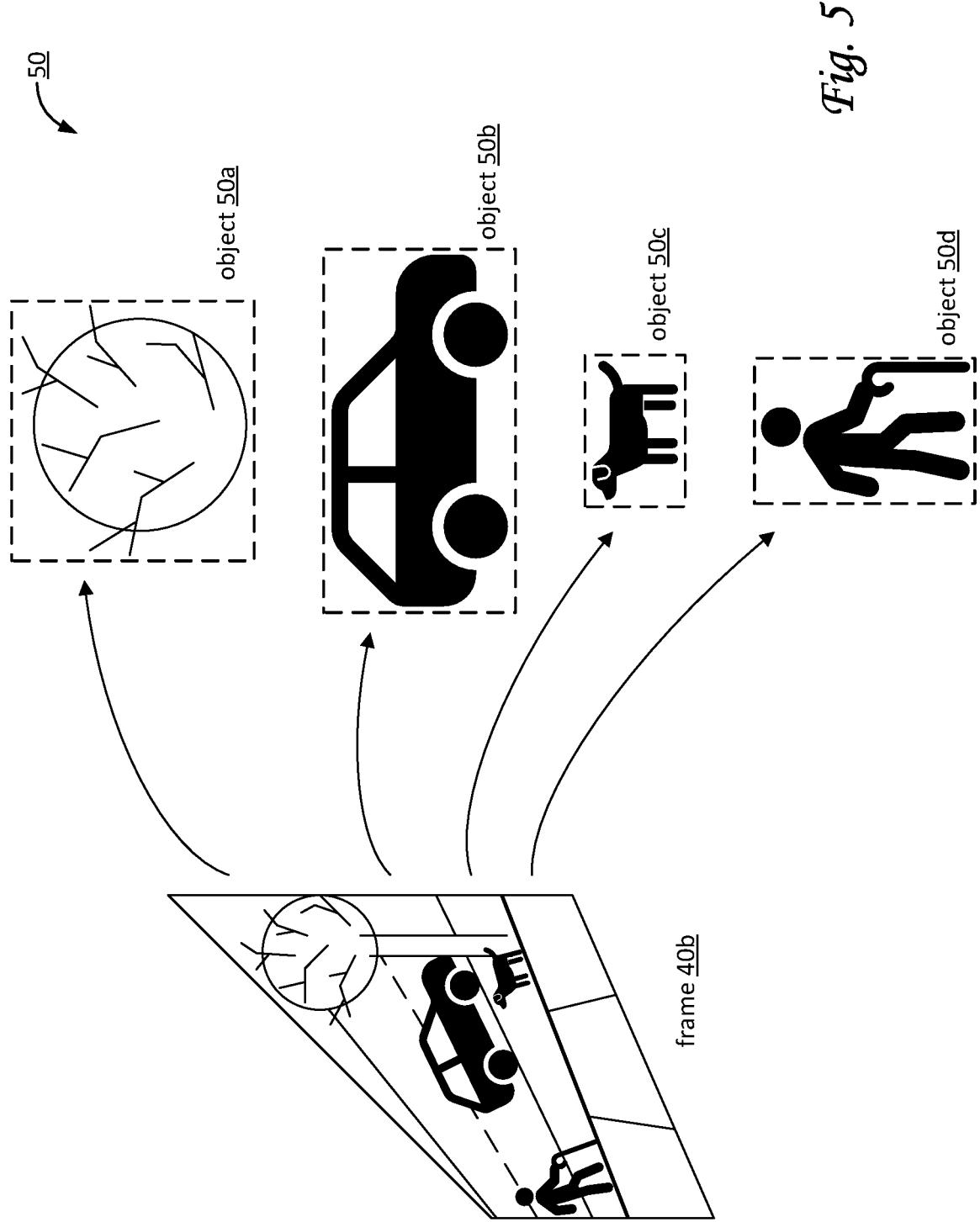

SYSTEMS AND METHODS FOR PERFORMING OBJECT DETECTION AND MOTION DETECTION ON VIDEO INFORMATION

FIELD OF THE DISCLOSURE

The present disclosure relates to systems and methods for selectively converting video information into electronic output files, and, in particular, efficiently finding and/or detecting pertinent video information in individual videos.

BACKGROUND

Video-based security systems are known. Automated motion detection for video cameras is known. Certain types of object detection and motion detection are known.

SUMMARY

One aspect of the present disclosure relates to a system configured for selectively converting video information into electronic output files. The system may include one or more hardware processors configured by machine-readable instructions. The processor(s) may be configured to obtain video information defining one or more videos. The one or more videos may include a particular video. The particular video may include video content having a progress length. The video content may include visual content viewable as a function of progress through the progress length. The visual content may have a first electronic format. The progress length may range between 3 seconds and 1 minute when viewed at a frame rate between 20 frames per second and 60 frames per second. The visual content may be included within one or more images and/or one or more video frames of the particular video. The video content may have been captured by one or more capture devices. The processor(s) may be configured to select a subset of the visual content included in the video content of the particular video. The subset may be at least 20 times smaller than the visual content. The processor(s) may be configured to perform object detection to detect objects in the selected subset. The object detection may include multiclass classification of a set of classes. The set of classes may include a first class that represents living entities, e.g., people. The processor(s) may be configured to perform motion detection to detect movement for one or more of the detected objects in the selected subset, responsive to the object detection detecting one or more detected objects. The processor(s) may be configured to generate and store an electronic output file, responsive to the motion detection detecting movement. The electronic output file may be in a second electronic format, e.g., different than the first electronic format. The second electronic format may be a raster-graphics file format. The electronic output file may include one or more representations of the detected objects for which movement has been detected by the motion detection.

Another aspect of the present disclosure relates to a method for converting video information into electronic output files. The method may include obtaining video information defining one or more videos. The one or more videos may include a particular video. The particular video may include video content having a progress length. The video content may include visual content viewable as a function of progress through the progress length. The visual content may have a first electronic format. The progress length may range between 3 seconds and 1 minute when viewed at a frame rate between 20 frames per second and 60 frames per second. The visual content may be included within one or more images and/or one or more video frames of the particular video. The video content may have been captured by one or more capture devices. The method may include selecting a subset of the visual content included in the video content of the particular video. The subset may be at least 20 times smaller than the visual content. The method may include performing object detection to detect objects in the selected subset. The object detection may include multiclass classification of a set of classes. The set of classes may include a first class that represents living entities, e.g., people. The method may include performing motion detection to detect movement for one or more of the detected objects in the selected subset, responsive to the object detection detecting one or more detected objects. The method may include generating and storing an electronic output file, responsive to the motion detection detecting movement. The electronic output file may be in a second electronic format, e.g., different than the first electronic format. The second electronic format may be a raster-graphics file format. The electronic output file may include one or more representations of the detected objects for which movement has been detected by the motion detection.

As used herein, any association (or relation, or reflection, or indication, or correspondency) involving servers, processors, client computing platforms, video information, videos, video content, visual content, progress length, electronic formats, frame rates, subsets, frames, objects, movement, faces, detections, classifications, classes, labels, output files, people, vehicles, thresholds, comparisons, differences, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, create, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 5 illustrates exemplary object detection and/or motion detection for exemplary video content of a particular frame of a particular video, as may be used by a system configured for converting video information into an electronic output file, in accordance with one or more implementations.

DETAILED DESCRIPTION

Figure 1:
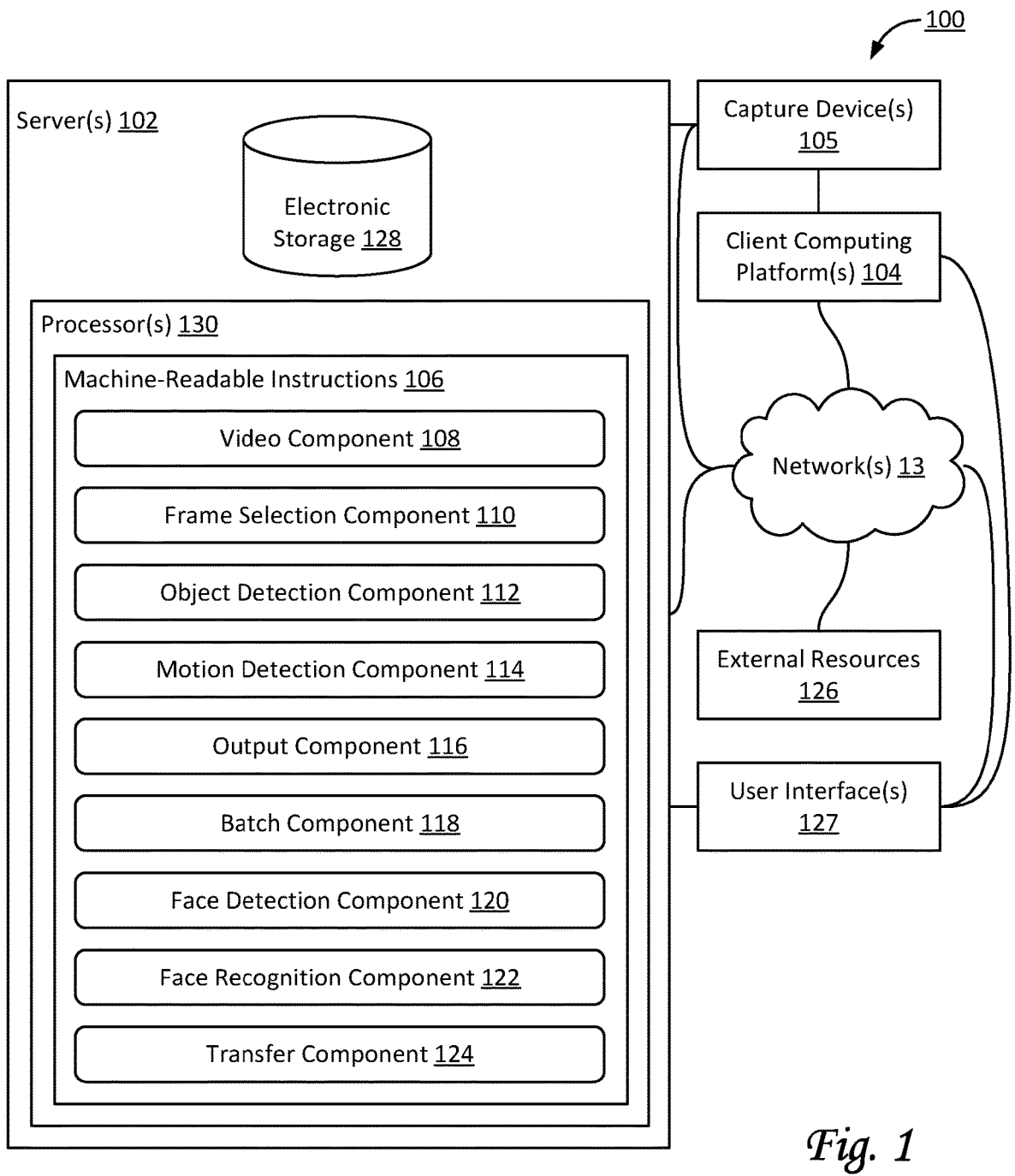
FIG. 1 illustrates a system configured for converting video information into electronic output files, in accordance with one or more implementations.

FIG. 1 illustrates a system 100 configured for converting video information into electronic output files, and/or otherwise generating electronic output files, in accordance with one or more implementations. In some implementations, system 100 may be used to analyze and/or process the video information to detect only certain types of objects, certain types of movement, and/or certain types of information. In some implementations, a user of system 100 may control what types of objects and/or what types of movement are pertinent and/or relevant for the electronic output files. For example, some users may be interested in detecting moving vehicles in the video information, whereas user users may prefer to ignore moving vehicles. For example, some users may be interested in detecting moving animals and/or wildlife in the video information, whereas user users may prefer to ignore moving animals and/or wildlife. In some implementations, certain video information defining certain videos may be discarded if no pertinent and/or relevant detections have been made, in which case no electronic output file(s) are generated that correspond to those certain videos. In some implementations, some or all components of system 100 may form a video information processing pipeline.

In some implementations, system 100 may include one or more servers 102, electronic storage 128, one or more client computing platforms 104, one or more capture devices 105, one or more user interfaces 127, and/or other components. Server(s) 102 may be configured to communicate with client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104. The users may include a first user, a second user, a third user, and so forth. For example, the first user may be associated with a first client computing platform 104, the second user may be associated with a second client computing platform, and so forth.

Electronic storage 128 may comprise non-transitory storage media that electronically stores information, including but not limited to video information, framing information, and/or other information. Video information may define one or more videos. Individual videos may include video content having individual progress lengths. The video content of a video may include visual content viewable as a function of progress through the progress length. The visual content at a particular moment in time may be referred to as an image or a (video) frame. The visual content of a video may have a field of view. In some implementations, framing information for a video may define multiple framings of the visual content at multiple moments within the progress length. For example, an individual framing of the visual content may define a positioning of a viewing window within the field of view of the visual content at a corresponding moment within the progress length. The viewing window may define extents of the visual content to be included within a presentation of the video content. The multiple framings of the visual content may include a first framing of the visual content at a first moment within the progress length, a second framing of the visual content at a second moment within the progress length, and/or other framing of the visual content at other moments within the progress length. The second framing of the visual content may be different from the first framing of the visual content.

Content of one or more videos may be referred to as video content. The video content of a video may have a progress length. That is, a video may include video content having a progress length. A progress length may be defined in terms of time durations and/or frame numbers. For example, video content of a particular video may have a time duration of 60 seconds. Video content of the particular video may have 1800 video frames. Video content having 1800 video frames may have a play time duration of 60 seconds when viewed at 30 frames per second. Common frame rates for video capture (also referred to as capture frame rates) may range from 20 frames per second to 60 frames per second, assuming equal capture frame rates and playback frame rates. For some applications, capture frame rates may range between 30 frames per second and 120 frames per second. In some implementations, for slow-motion or time-lapse videos, frame rates may fall outside of the range of common frame rates. Other progress lengths, time durations, frame rates, and frame numbers are contemplated. A video frame may include an image of the video content at a moment within the progress length of the video content. A video frame may include one or more of I-frame, P-frame, B-frame, frame of pixels, and/or other video frames. Visual content may be generated based on light received within a field of view of a single-image sensor or within fields of view of multiple-image sensors during a capture period.

Video content may include visual content, audio content, animated content, and/or other content. For example, video content may include visual content viewable as a function of progress through the progress length of the video content, audio content playable as a function of progress through the progress length of the video content, and/or other content that may be played back as a function of progress through the progress length of the video content.

Capture devices 105 may include one or more of single-image capture devices (e.g., image sensor, camera), multiple-image capture devices (e.g., video camera), and/or one or more other capture devices (e.g., sound sensor, microphone). A video including content captured by multiple-capture devices may include content captured at the same location(s), content captured at different locations, content captured at the same time(s), and/or content captured at different times. A video may include edited content. For example, a video may include content of one or more other videos that have been edited into a video edit. In some implementations, videos may have been captured by security cameras, including but not limited to home security cameras. In some implementations, a particular capture device 105 may have been triggered to initiate the capture and/or storage of a video of limited duration. For example, in some implementations, the limited duration may range between 3 seconds and 1 minute. For example, in some implementations, the limited duration may range between 4 seconds and 30 seconds. For example, in some implementations, the limited duration may range between 5 seconds and 20 seconds. Other durations are contemplated within the scope of this disclosure. In some implementations, the start time and end time for a video of limited duration may have been determined such that the triggering event occurs in the center or middle of the limited duration. In some implementations, the start time and end time for a video of limited duration may have been determined such that the triggering event occurs at a known point in time during the limited duration.

Server(s) 102 may be configured by machine-readable instructions 106. Machine-readable instructions 106 may include one or more instruction components. The instruction components may include computer program components. The instruction components may include one or more of video component 108, frame selection component 110, object detection component 112, motion detection component 114, output component 116, batch component 118, face detection component 120, face recognition component 122, transfer component 124, and/or other instruction components.

Video component 108 may be configured to obtain video information defining one or more videos. For example, the videos may include a first video, a second video, a third video, and so forth. In some implementations, video information may be obtained from electronic storage 128, capture devices 105, and/or other components. The one or more videos may include a particular video. Individual videos may include video content having individual progress lengths. The video content may include visual content viewable as a function of progress through an individual progress length. The visual content of an individual video may have a particular electronic format, e.g., a first electronic format. In some implementations, video information may include a request, implicit or explicit, to be analyzed as described in this disclosure and/or to provide an electronic output file based on (conversion of) the video information. In some implementations, the particular electronic format may define a particular resolution for the individual video.

In some implementations, one or more individual progress lengths may range between 3 seconds and 1 minute when viewed at the capture frame rate. Other progress lengths are contemplated within the scope of this disclosure. In some implementations, the capture frame rate may range between 20 frames per second and 60 frames per second. Other frame rates are contemplated within the scope of this disclosure. In some implementations, the visual content of a particular video may be included within one or more images and/or one or more video frames of the particular video. In some implementations, the video content of a particular video may have been captured by one or more capture devices 105.

In some implementations, obtained video information may include meta-information about a particular video. In some implementations, obtained video information may be associated with meta-information about a particular video. For example, the meta-information may include specifics about the make and model of the particular capture device that was used to capture content included in the particular video. For example, the meta-information may include specifics about the software and/or firmware version of the particular capture device that was used to capture content included in the particular video. For example, the meta-information may include specifics about the source and/or origin of the obtained video information, including but not limited to a particular (web/online) service, a particular company, and/or other information regarding the provider of the particular video. For example, the meta-information may include specifics about the user and/or owner of the obtained video information or the particular capture device. For example, the meta-information may include timing information pertaining to the content of the video information, such as, by way of non-limiting example, a timestamp and/or frame number that indicates the moment(s) events of interest begin and/or are centered around. For example, the meta-information may include specifics about an installation profile (e.g., of the particular user/camera/provider) that was used to generate the video information. In some implementations, meta-information may be camera-specific, capture-device-specific, provider-specific, web-service-specific, user-specific, installation-profile-specific, and/or otherwise specific.

Frame selection component 110 may be configured to select subsets of visual content included in the video content of one or more videos. For example, the subsets may include a first subset, a second subset, a third subset, and so forth. In some implementations, frame selection component 110 may be configured to select one subset of visual content included in the video content of one video. In some implementations, frame selection component 110 may be configured to select multiple subsets of visual content included in the video content of one video. In some implementations, frame selection component 110 may be configured to select multiple subsets of visual content included in the video content of multiple videos. In some implementations, a selected subset of a particular video may include one or more images and/or video frames. For example, a selected subset may include a first video frame, a second video frame, a third video frame, and so forth.

In some implementations, a particular selected subset of particular visual content may be at least 20 times smaller than the particular visual content. For example, a particular video may have a time duration of 4 seconds, at 25 frames per second, for a total of 100 video frames. The selected subset may be 20 times smaller, and include 5 video frames. In some implementations, a particular selected subset of particular visual content may be at least 100 times smaller than the particular visual content. For example, a particular video may have a time duration of 30 seconds, at 30 frames per second, for a total of 900 video frames. The selected subset may be more than 100 times smaller, and include 7 video frames. In some implementations, frame selection component 110 may be configured to select individual subsets of video frames for individual videos such that the individual subsets include between 3 and 10 video frames. In some implementations, the individual subsets may include between 3 and 5 video frames.

In some implementations, a first video frame may be selected near the start time of a particular video. For example, the first video frame may be selected at 5%, 10%, and/or another percentage lower than 50% of the duration of the particular video. In some implementations, a second video frame may be selected near the end time of a particular video. For example, the second video frame may be selected at 90%, 95%, and/or another percentage greater than 50% of the duration of the particular video.

In some implementations, selections by frame selection component 110 may be based on meta-information included and/or associated with the video information. For example, particular meta-information may indicate and/or suggest a particular timestamp and/or frame number to be used by frame selection component 110. For example, videos from a particular type of security cameras may by default include a moment of interest at 3 seconds into the video. In some implementations, determining a particular timestamp and/or frame number to be used by frame selection component 110 may be based on one or more of heuristics, rules, and/or machine-learning using information regarding previously-received video information and corresponding previously-generated electronic output files.

Subsequent processing by system 100 may be highly efficient (compared to using every video frame in a video) since at least 95% of the video frames may not be used for most if not all of the subsequent processing (in particular object detection and motion detection) by other components of system 100.

Figure 4:
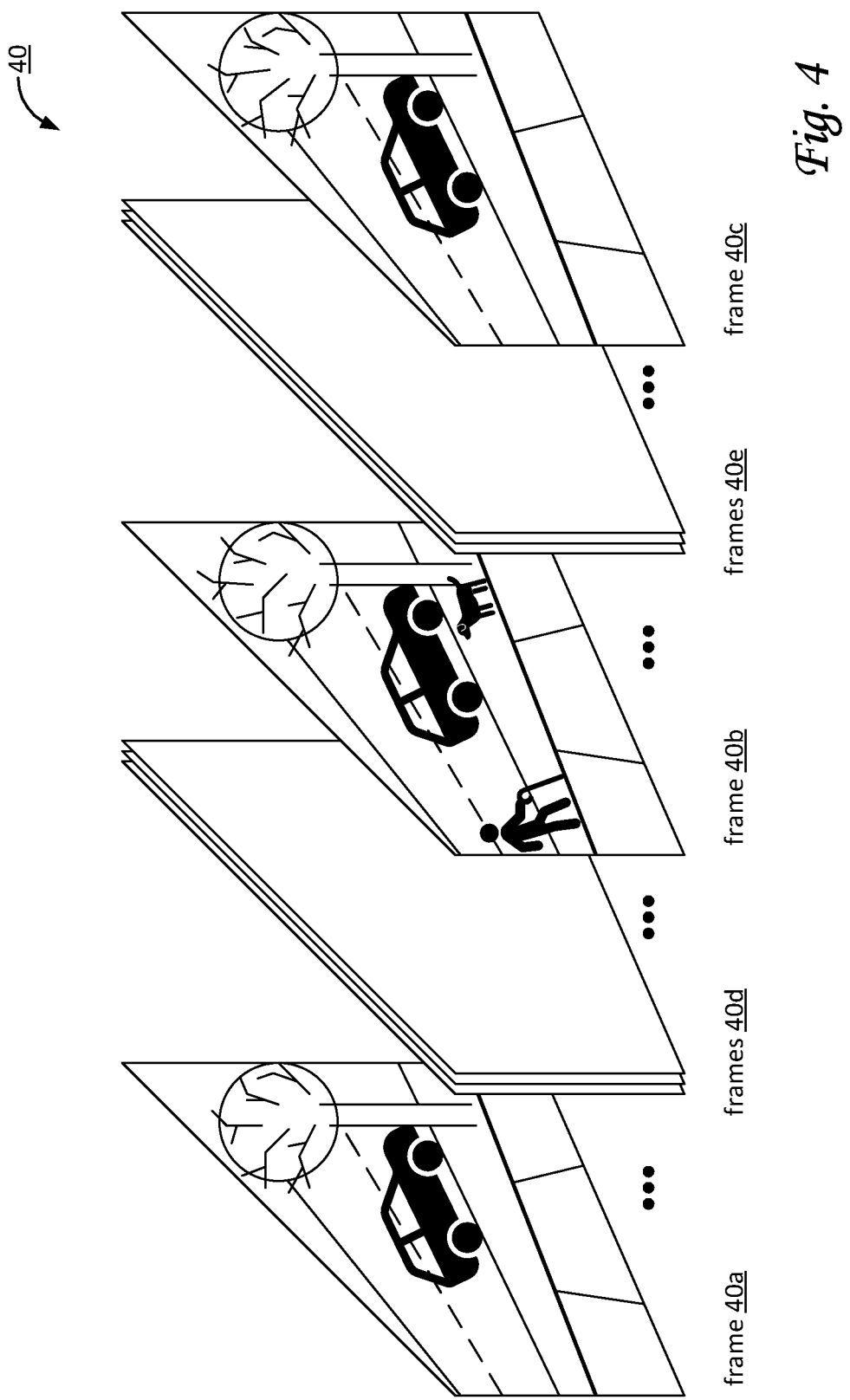
FIG. 4 illustrates exemplary video content of a particular video, depicting multiple video frames, as may be used by a system configured for converting video information into an electronic output file, in accordance with one or more implementations.

By way of non-limiting example, FIG. 4 illustrates exemplary video content 40 of a particular video, depicting multiple video frames isometrically, as may be used by system 100. For example, exemplary video content 40 may have been captured by a home security camera aimed down a driveway such that the field of view as depicted includes a sidewalk, part of a public street, and a tree. Exemplary video content 40 may have a particular progress length, here depicted as ranging from a frame 40*a* to a frame 40*c*. For example, the particular progress length may range between 3 seconds and 20 seconds. Accordingly, frame 40*a* is older than frame 40*c*. Exemplary video content 40 may include a set of video frames, including frame 40*a*, one or more frames 40*d*, a frame 40*b*, one or more frames 40*e*, and frame 40*c*. For example, frame 40*b* may be centered in the middle of the particular progress length. Referring to FIG. 1, frame selection component 110 may select a subset of video frames from exemplary video content 40 in FIG. 4. For example, a selected subset may include frame 40*a*, frame 40*b*, and frame 40*c*. In some implementations, a particular selected subset may include frame 40*a*, frame 40*b*, frame 40*c*, and one or more other video frames.

Referring to FIG. 1, object detection component 112 may be configured to perform object detection to detect objects in one or more video frames, a selected subset of visual content, and/or other video content. In some implementations, the object detection may include multiclass classification of a set of classes. For example, the object detection may be implemented using a convolutional neural network. A convolutional neural network may refer to a neural network that receives an input and transforms the input through a series of layers. A convolutional neural network may include a series of linear and non-linear operations applied to an input tensor of data. A convolutional neural network may include one or more layers. For example, a convolutional neural network may include one or more of an input layer, an output layer, a convolution layer, a padding layer, a squeeze layer, an expand layer, a concatenation layer, a combine layer, a pooling layer, a normalization layer, a fully-connected layer, an activation layer, a drop layer, a flatten layer, and/or other layers. The layers may define one or more operations on an input (e.g., an image) to the convolutional neural network. In some implementations, convolution layers may be processed using binary convolution. In some implementations, the object detection may include multi-label multiclass classification.

The set of classes may include a first class, a second class, a third class, and so forth. For example, the set of classes may include a first class that represents living entities. For example, the set of classes may include a class that represents people. For example, the set of classes may include a class that represents animals. In some implementations, the set of classes may include a class that represents vehicles. In some implementations, object detection component 112 may be configured to generate and/or define bounding boxes around detected objects.

In some implementations, classification by object detection component 112 may be hierarchical. Object detection may be performed at multiple levels in a hierarchy. For example, a particular class (say, animals) may include sub-classes (say, cats, dogs, bears, etc.), sub-sub-classes (e.g., neighborhood dog, family dog, other dog, etc., or the breed or ownership of individual animals), and so forth. For example, a class for vehicles may include sub-classes for sedans, vans, pickup trucks, buses, and so forth. A particular sub-class for vehicles may include a sub-sub-class for the make and/or model of a vehicle. Object detection component 112 may be configured to detect classes, sub-classes, sub-sub-classes, and so forth.

By way of non-limiting example, FIG. 5 illustrates exemplary object detection 50 for exemplary video content of frame 40*b* (cf. FIG. 4) of a particular video, as may be used by system 100. As depicted in FIG. 5, object detection of frame 40*b* may have detected an object 50*a* (a tree, or part of a tree), an object 50*b* (a vehicle), an object 50*c* (a dog), and an object 50*d* (a person). In some implementations, detected objects 50*c* and 50*d* may be classified as living entities. In some implementations, detected objects 50*c* and 50*d* may be classified as animals (or animated entities). In some implementations, detected objects 50*a*, 50*c*, and 50*d* may be classified as living entities. In some implementations, detected object 50*d* may be classified as people/a person. In some implementations, a detected object may be classified as more than one type of object.

Referring to FIG. 1, motion detection component 114 may be configured to perform motion detection to detect one or more movements in one or more video frames, a selected subset of visual content, and/or other video content. In some implementations, motion detection component 114 may be configured to detect movement for objects detected by object detection component 112. For example, motion detection may be limited to areas within generated bounding boxes, such as bounding boxes generated by object detection component 112. In some implementations, motion detection may be limited to detected objects of interest to a particular user (e.g., as indicated by the particular user, certain classes, sub-classes, and/or sub-sub-classes of objects may be of interest to the particular user). In some implementations, motion detection component 114 may be configured to differentiate and/or compare different frames (e.g., at least a predetermined time apart) within a particular video to detect whether an object of interest moved between the different frames. Without such movement, the particular video may be discarded, in which case no electronic output file is generated that corresponds to this particular video.

In some implementations, motion detection component 114 may be configured to perform motion detection in an automated manner using several steps. In some implementations, the several steps may include blurring part or all of a video frame, multiple video frames, and/or a selected subset of visual content. In some implementations, the several steps may include setting contour levels for the blurred part or all of a video frame, multiple video frames, and/or a selected subset of visual content. In some implementations, the several steps may include quantifying one or more differences between the blurred part of at least two selected video frames. In some implementations, the several steps may include comparing the one or more quantified differences with a motion threshold level to determine whether a particular movement is detected. In some implementations, motion detection may be implemented using a (convolutional) neural network.

In some implementations, motion detection by motion detection component 114 may be hierarchical. For example, motion detection may distinguish different types of motion, and these different types of motion may be organized in a hierarchy. For example, a particular type of motion may include sub-types of motion, which may include sub-sub-types of motion, and so forth.

Referring to FIG. 4 and FIG. 5, for example, frame 40a, frame 40b and frame 40c in FIG. 4 may include a detected object, object 50b (FIG. 5), but analysis of frame 40a, frame 40b and frame 40c by motion detection component 114 may reveal that object 50b does not move. For example, object 50b may be a parked car. Manual visual inspection of detected object 50a between frame 40a, frame 40b and frame 40c may indicate small movements of various branches. However, using several steps of motion detection as described (including, e.g., blurring, setting a contour level, quantifying differences, and/or comparing the differences with a threshold) may reveal that detected object 50a does not move in a way that is pertinent and/or relevant for system 100.

Referring to FIG. 1, output component 116 may be configured to generate and/or store electronic output files. Individual electronic output files may correspond to individual videos in the obtained video information. In some implementations, electronic output files may be in a particular electronic format. For example, the particular electronic format may be different than the electronic format of the visual content obtained by video component 108. In some implementations, the particular electronic format used by output component 116 may be a raster-graphics file format. By way of non-limiting example, the particular electronic format may be one of jpg, png, gif, tif, bmp, and/or other raster-graphics file formats. In some implementations, electronic output files may include one or more representations of detected objects for which movement has been detected. In some implementations, a particular electronic output file generated by output component 116 may include all or some of the subset of visual content selected by frame selection component 110. In some implementations, the particular electronic output file generated by output component 116 may include (e.g., superimposed over/around detected objects) one or more bounding boxes defined by object detection component 112. In some implementations, the particular electronic output file generated by output component 116 may be zoomed in on detected objects. In some implementations, the particular electronic output file generated by output component 116 may include meta-information, such as a date, timestamp, and/or other pertinent information. In some implementations, a particular electronic output file generated by output component 116 may include additional visual content and/or video frames beyond the selected subset of visual content.

Batch component 118 may be configured to create a batch of subsets of visual content included in video content of multiple videos. In some implementations, performing the object detection (by object detection component 112) and the motion detection (by motion detection component 114) may be performed for the batch. The multiple videos used to create a batch may not need to be related to a single user or a single capture device. In some implementations, batch component 118 may be configured to create batches based on one or more of the particular electronic format of different videos, particular ranges of individual progress length of the different videos, particular frame rates of the different videos, a particular resolution of the different videos, particular meta-information and/or specifics about the different videos, particular cost considerations for certain types of processing of the different videos, particular processing performance considerations (e.g., processing power, processing speed, processing accuracy and/or reliability, etc.) for certain types of processing of the different videos, and/or other characteristics that may distinguish the different videos.

Face detection component 120 may be configured to perform face detection to detect faces in one or more video frames, a selected subset of visual content, and/or other video content. In some implementations, face detection component 120 may be configured to perform face detection responsive to detection of a person. In some implementations, face detection component 120 may be configured to not perform face detection unless a person has been detected. In some implementations, face detection component 120 may be configured to perform face detection only for the portion of a video frame for which an object has been detected, specifically a person. In some implementations, face detection may be implemented using a convolutional neural network.

Face recognition component 122 may be configured to perform face recognition on a detected face. For example, face recognition may only be formed if a face has been detected. In some implementations, face recognition component 112 may be configured to access a database of known and/or previously-recognized face. For example, such a database may be stored in electronic storage 128. Face recognition component 112 may be configured to compare a detected face with known and/or previously-recognized faces in the database. Based on such a comparison, face recognition component 112 may be configured to determine whether the detected face is similar to any of the known and/or previously-recognized faces. In some implementations, face recognition component 112 may quantify how similar the detected face is to the closest known and/or previously-recognized face in the database. In some implementations, results and/or other information from face recognition component 112 may be included in the electronic output file.

Transfer component 124 may be configured to transfer electronic output files, e.g. to a user. For example, a user may have indicated which kinds of detected objects and/or motion are of interest. In some implementations, a user may have indicated which classes, sub-classes, sub-sub-classes of detected objects and/or motion are of interest. In some implementations, a user may have indicated which types, sub-types, sub-sub-types of detected motion are of interest. For example, detected moving animals may be generally of no interest, unless a bear is detected. For example, detected motion along a public sidewalk may be generally of no interest, unless the detected person, object, or animal approaches the front door. Transfer component 124 may transfer electronic output files that meet the user's interest to the user.

Figure 3:
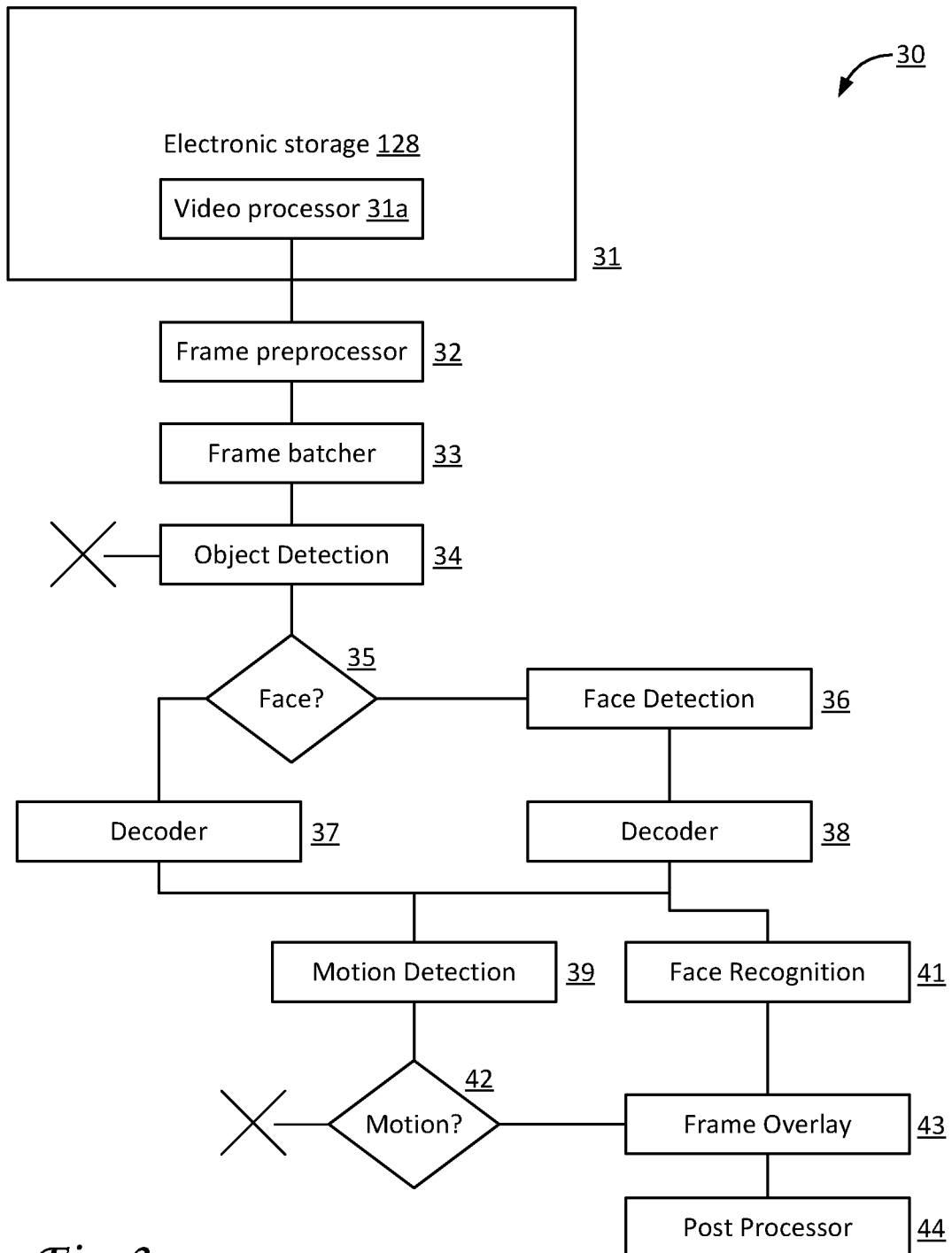
FIG. 3 illustrates an exemplary flow diagram depicting an example of an operational flow supported by a system configured for converting video information into electronic output files, in accordance with one or more implementations.

Based on the particular type and source of video information, as well as the interest of users, the components of system 100 may be arranged in different ways to create different video information processing pipelines. By way of non-limiting example, FIG. 3 illustrates an exemplary flow diagram 30 depicting an example of an operational flow supported by system 100. Users of exemplary flow diagram 30 are assumed to be interested in moving objects of specified classes only, and particularly in faces. Exemplary flow diagram 30 starts with block 31, in which video information defining videos is stored in electronic storage 128 and transferred by a video processor 31a to a frame preprocessor 32. Video processor 31a may obtain and/or determine meta-information about the video information. Frame preprocessor 32 may be configured to process received video information in preparation for the remainder of the blocks in FIG. 3. Frame preprocessor 32 may transfer video information and/or video frames to a frame batcher 33. In some implementations, video processor 31a and/or frame preprocessor 32 may be configured to obtain and/or determine particular meta-information that may indicate and/or suggest a particular timestamp and/or frame number to be used downstream in a video information processing pipeline, including but not limited to the example shown in FIG. 3. Frame batcher 33 may be configured to batch together video frames and/or other video content from different videos. Frame batcher 33 may be configured to transfer a batch of video frames and/or other video content to object detection block 34, which may be configured to perform object detection in a manner similar to or the same as object detection component 112 in FIG. 1. Subsequently, exemplary flow diagram 30 may reach a decision block 35, to determine whether the detected object includes a person and/or a face. If so, face detection block 36 may perform face detection in a manner similar to or the same as face detection component 120 in FIG. 1, followed by a decoder block 38. If not (meaning other types of objects were detected), exemplary flow diagram 30 may reach a decoder block 37. If no objects of any pertinent type were detected, the current video frame or selected subset of visual content may be considered of no interest to the user, such that no electronic output file is generated (indicated by a large "X" in FIG. 3). Decoder blocks 37 and 38 may be configured to generate and/or store electronic output files that include detected objects. Decoder blocks 37 and 38 may perform in a manner similar to or the same as output component 116 in FIG. 1. Subsequently, exemplary flow diagram 30 may reach motion detection block 39, followed by a decision block 42, to determine whether the detected object is moving. Motion detection block 39 may perform motion detection in a manner similar to or the same as motion detection component 114 in FIG. 1. In some implementations, face detection block 36 and decoder block 38 may be followed by a face recognition block 41, which may perform face recognition in a manner similar to or the same as face recognition component 122 in FIG. 1. If motion is detected, exemplary flow diagram 30 may reach a frame overlay block 43 and a post processor block 44. If no motion is detected, the current video frame or selected subset of visual content may be considered of no interest to the user, such that no electronic output file is generated. Frame overlay block 43 may be configured to combine information from different decoder blocks detection blocks and face recognition block 41, to create electronic output files. Post processor block may store and/or transfer generated electronic output files to users, in a manner similar to or the same as transfer component 124 in FIG. 1. The arrangement of elements and blocks in exemplary flow diagram 30 is intended to be exemplary, and not limiting in any way.

Referring to FIG. 1, in some implementations, server(s) 102, client computing platform(s) 104, and/or external resources 126 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform 104 may include one or more processors configured to execute computer program components. The computer program components may be configured to enable an expert or user associated with the given client computing platform 104 to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

User interfaces 127 may be configured to facilitate interaction between users and system 100 and/or between users and client computing platforms 104. For example, user interfaces 127 may provide an interface through which users may provide information to and/or receive information from system 100. In some implementations, user interface 127 may include one or more of a display screen, touchscreen, monitor, a keyboard, buttons, switches, knobs, levers, mouse, game controller, microphone, sensor to capture voice commands, sensor to capture eye movement and/or body movement, sensor to capture hand and/or finger gestures, and/or other user interface devices configured to receive and/or convey user input. In some implementations, one or more user interfaces 127 may be included in one or more client computing platforms 104. In some implementations, one or more user interfaces 127 may be included in system 100. For example, in some implementations, system 100 may be configured to present electronic output files (e.g., generated by output component 116) to a user.

External resources 126 may include sources of information outside of system 100, external entities participating with system 100, and/or other resources. In some implementations, some or all of the functionality attributed herein to external resources 126 may be provided by resources included in system 100. In some implementations, external resources 126 may provide cloud-based processing capabilities. For example, certain types of processing as described in this disclosure (by way of non-limiting example, object detection, motion detection, face detection, etc.) may be off-loaded to external resources 126, including but not limited to cloud-based processing capabilities. In some implementations, different options for cloud-based processing capabilities may be associated with different cost considerations. In some implementations, different options for cloud-based processing capabilities may be associated with different processing performance considerations. In some implementations, batch component 118 may be configured to create batches such that a first batch of videos will be processed by a first external resource 126 according to a first cost arrangement, thus incurring a first cost, and a second batch of videos will be processed by a second external resource 126 according to a second cost arrangement, thus incurring a second cost, and so forth. In some implementations, batch component 118 may be configured to create batches such that a first batch of videos will be processed by a first external resource 126 having a first level or type of processing performance, and a second batch of videos will be processed by a second external resource 126 having a second level or type of processing performance, and so forth. In some implementations, batch component 118 may be configured to dynamically create different batches based on information included with the requests to analyze particular video information for particular videos, as obtained by video component 108. For example, a first particular video may be associated with meta-information that causes batch component 118 to dynamically assign certain types of processing for the first particular video to first external resource 126. For example, a second particular video may be associated with meta-information that causes batch component 118 to dynamically assign certain types of processing for the second particular video to second external resource 126.

Server(s) 102 may include electronic storage 128, one or more processors 130, and/or other components. Server(s) 102 may include communication lines, or ports to enable the exchange of information with one or more network 13 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The information may include video information defining video, information relating to video, information relating to visual content of video, framing information for video, information relating to framings of visual content, information relating to viewing window, information relating to viewing path, information relating to presentation of video content, and/or other information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, 114, 116, 118, 120, 122, and/or 124, and/or other components. Processor(s) 130 may be configured to execute components 108, 110, 112, 114, 116, 118, 120, 122, and/or 124, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, 122, and/or 124 are illustrated in FIG. 1 as being implemented within a single processing unit, in implementations in which processor(s) 130 includes multiple processing units, one or more of components 108, 110, 112, 114, 116, 118, 120, 122, and/or 124 may be implemented remotely from the other components. The description of the functionality provided by the different components 108, 110, 112, 114, 116, 118, 120, 122, and/or 124 described below is for illustrative purposes, and is not intended to be limiting, as any of components 108, 110, 112, 114, 116, 118, 120, 122, and/or 124 may provide more or less functionality than is described. For example, one or more of components 108, 110, 112, 114, 116, 118, 120, 122, and/or 124 may be eliminated, and some or all of its functionality may be provided by other ones of components 108, 110, 112, 114, 116, 118, 120, 122, and/or 124. As another example, processor(s) 130 may be configured to execute one or more additional components that may perform some or all of the functionality attributed below to one of components 108, 110, 112, 114, 116, 118, 120, 122, and/or 124.

Figure 2:
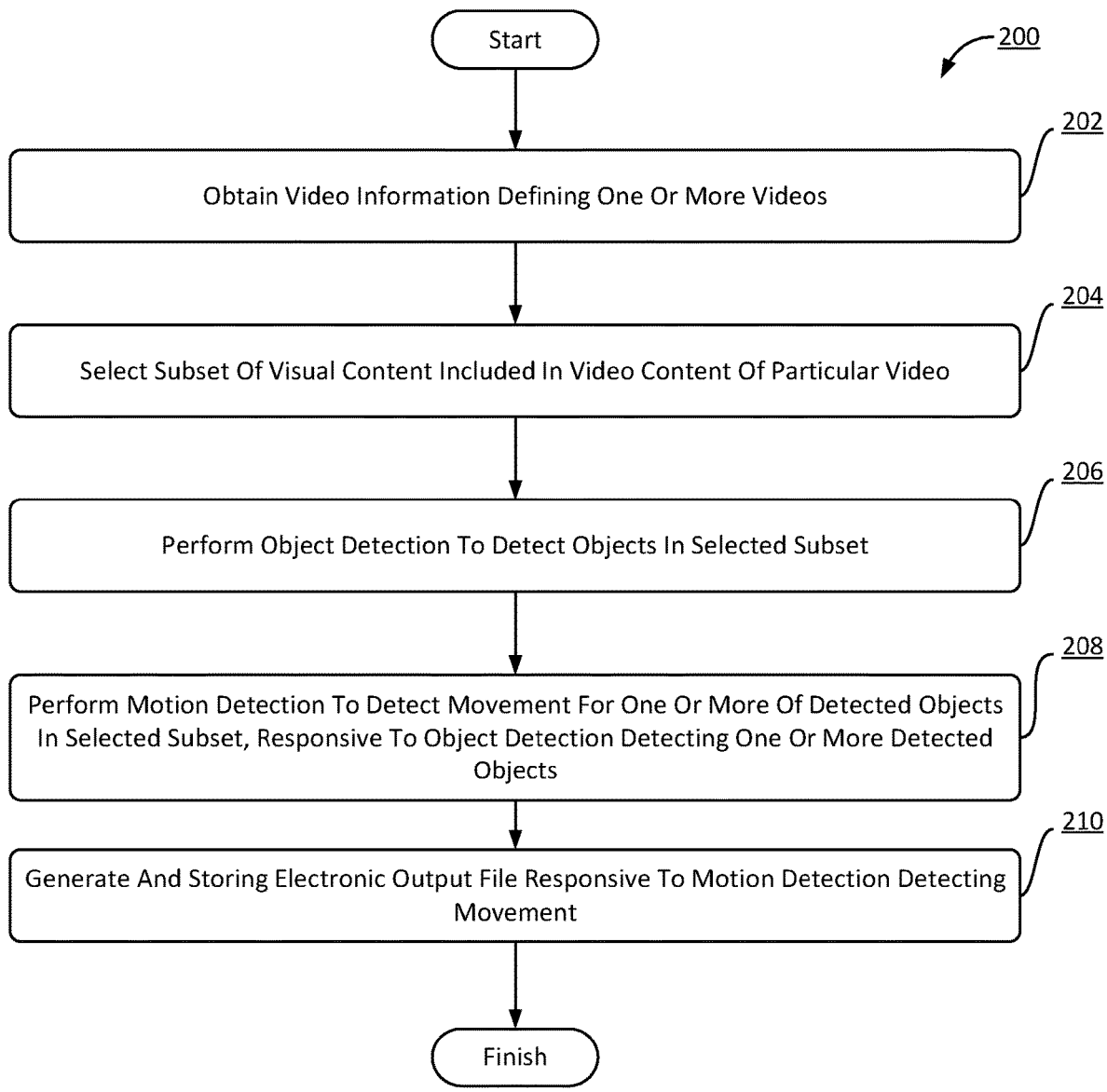
FIG. 2 illustrates a method for converting video information into electronic output files, in accordance with one or more implementations.

FIG. 2 illustrates a method 200 for converting video information into electronic output files, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include obtaining video information defining one or more videos. The one or more videos may include a particular video. The particular video may include video content having a progress length. The video content may include visual content viewable as a function of progress through the progress length. The visual content may have a first electronic format. The progress length may range between 3 seconds and 1 minute when viewed at a frame rate between 20 frames per second and 60 frames per second. The visual content may be included within one or more images and/or one or more video frames of the particular video. The video content may have been captured by one or more capture devices. Operation 202 may be performed by one or more hardware processors configured by machine-readable instructions including a component that is the same as or similar to video component 108, in accordance with one or more implementations.

An operation 204 may include selecting a subset of the visual content included in the video content of the particular video. The subset may be at least 20 times smaller than the visual content. Operation 204 may be performed by one or more hardware processors configured by machine-readable instructions including a component that is the same as or similar to frame selection component 110, in accordance with one or more implementations.

An operation 206 may include performing object detection to detect objects in the selected subset. The object detection may include multiclass classification of a set of classes. The set of classes may include a first class that represents living entities. Operation 206 may be performed by one or more hardware processors configured by machine-readable instructions including a component that is the same as or similar to object detection component 112, in accordance with one or more implementations.

An operation 208 may include performing motion detection to detect a movement for one or more of the detected objects in the selected subset, responsive to the object detection detecting one or more detected objects. Operation 208 may be performed by one or more hardware processors configured by machine-readable instructions including a component that is the same as or similar to motion detection component 114, in accordance with one or more implementations.

An operation 210 may include generating and storing an electronic output file, responsive to the motion detection detecting the movement. The electronic output file may be in a second electronic format. The second electronic format may be a raster-graphics file format. The electronic output file may include one or more representations of the detected objects for which the movement has been detected by the motion detection. Operation 210 may be performed by one or more hardware processors configured by machine-readable instructions including a component that is the same as or similar to output component 116, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for converting video information into electronic output files, the system comprising:
    one or more hardware processors configured by machine-readable instructions to:
        obtain video information defining one or more videos, the one or more videos including a particular video, the particular video including video content having a progress length, the video content including visual content viewable as a function of progress through the progress length, wherein the visual content has a first electronic format, wherein the progress length is less than 1 minute when viewed at a frame rate between 20 frames per second and 60 frames per second, wherein the video content has been captured by one or more capture devices;
        select a subset of the visual content included in the video content of the particular video, wherein the subset is at least 20 times smaller than the visual content;
        perform object detection to detect one or more objects in the selected subset, wherein the object detection includes multiclass classification of a set of classes, wherein the set of classes includes a first class that represents living entities;
        perform motion detection to detect a movement for at least one of the one or more objects in the selected subset, responsive to the object detection detecting one or more detected objects; and
        generate and store an electronic output file, responsive to the motion detection detecting the movement, wherein the electronic output file is in a second electronic format, and wherein the electronic output file includes one or more representations of the detected movement.

2. The system of claim 1, wherein the one or more hardware processors are further configured by machine-readable instructions to:
    create a batch of other subsets of other visual content included in other video content of the one or more videos, wherein performing the object detection and the motion detection are performed for the batch.

3. The system of claim 1, wherein the object detection further includes generating bounding boxes around the one or more objects.

4. The system of claim 1, wherein the set of classes includes a second class that represents animals and a third class that represents vehicles.

5. The system of claim 1, wherein the set of classes includes a class that represents people,
    wherein the one or more hardware processors are further configured by machine-readable instructions to perform face detection to detect faces in the selected subset, responsive to the object detection detecting a person.

6. The system of claim 5, wherein the one or more hardware processors are further configured by machine-readable instructions to:
    perform face recognition on a face, responsive to the face detection detecting the face.

7. The system of claim 1, wherein the motion detection is performed on the one or more objects.

8. The system of claim 1, wherein the motion detection includes blurring part or all of the selected subset, setting contour levels for the blurred part of the selected subset, quantifying one or more differences between the blurred part of at least two objects in the selected subset, and comparing the one or more differences with a motion threshold level to determine whether the movement is detected for individual ones of the one or more objects in the selected subset.

9. The system of claim 1, wherein the one or more hardware processors are further configured by machine-readable instructions to:
    transfer and/or present the electronic output file to a user.

10. The system of claim 1, wherein the subset is at least 100 times smaller than the visual content.

11. A method for converting video information into electronic output files, the method comprising:

obtaining video information defining one or more videos, the one or more videos including a particular video, the particular video including video content having a progress length, the video content including visual content viewable as a function of progress through the progress length, wherein the visual content has a first electronic format, wherein the progress length is less than 1 minute when viewed at a frame rate between 20 frames per second and 60 frames per second, wherein the video content has been captured by one or more capture devices;

selecting a subset of the visual content included in the video content of the particular video, wherein the subset is at least 20 times smaller than the visual content;

performing object detection to detect one or more objects in the selected subset, wherein the object detection includes multiclass classification of a set of classes, wherein the set of classes includes a first class that represents living entities;

performing motion detection to detect a movement for at least one of the one or more objects in the selected subset, responsive to the object detection detecting one or more detected objects; and generating and storing an electronic output file, responsive to the motion detection detecting the movement, wherein the electronic output file is in a second electronic format, and wherein the electronic output file includes one or more representations of the detected movement.

12. The method of claim 11, further comprising:
creating a batch of other subsets of other visual content included in other video content of the one or more videos, wherein performing the object detection and the motion detection are performed for the batch.

13. The method of claim 11, wherein the object detection further includes generating bounding boxes around the one or more objects.

14. The method of claim 11, wherein the set of classes includes a second class that represents animals and a third class that represents vehicles.

15. The method of claim 11, wherein the set of classes includes a class that represents people; the method further comprising:
performing face detection to detect faces in the selected subset, responsive to the object detection detecting a person.

16. The method of claim 15, further comprising:
performing face recognition on a face, responsive to the face detection detecting the face.

17. The method of claim 11, wherein the motion detection is performed on the one or more objects.

18. The method of claim 11, wherein the motion detection includes blurring part or all of the selected subset, setting contour levels for the blurred part of the selected subset, quantifying one or more differences between the blurred part of at least two objects in the selected subset, and comparing the one or more differences with a motion threshold level to determine whether the movement is detected for individual ones of the one or more objects in the selected subset.

19. The method of claim 11, further comprising:
transferring and/or presenting the electronic output file to a user.

20. The method of claim 11, wherein the subset is at least 100 times smaller than the visual content.

* * * * *